March 11, 1958  G. LANGE  2,826,115
PHOTOGRAPHIC OBJECTIVE
Filed July 16, 1954

United States Patent Office 2,826,115
Patented Mar. 11, 1958

2,826,115
PHOTOGRAPHIC OBJECTIVE

Günther Lange, Konigsbronn, Germany, assignor to Carl Zeiss, Heidenheim (Brenz), Wurttemberg, Germany Application July 16, 1954, Serial No. 443,740

4 Claims. (Cl. 88—57)

The present invention concerns photographic objectives which possess an intercept length of more than 80% of the focal length and for this purpose contain a meniscus-shaped dispersive front element. Such objectives are employed especially in the so-called monocular mirror reflex cameras, in which sufficient room is to be provided between the objective and the film also for a folding mirror. Object of the invention is an objective of this kind, in which three further elements follow the mentioned dispersive front element, namely a biconvex collective element, a meniscus-shaped dispersive element, and a meniscus-shaped collective element, of which the two latter consist each of two cemented together lenses of opposite refractive power and turn the concave side to the diaphragm lying between them.

In order to attain for the mentioned intended use an adequate intercept length of the objective in accordance with the invention, the vertex distance between the surfaces bounding the first air space is suitably selected within the limits of $0.15 \cdot f$ and $1.5 \cdot f$ whereby $f$ signifies the total focal length of the objective, whereby the distortion does not exceed the customary and tolerable degree.

For correction of the coma it is suitable to select the radius of the concave surface immediately following upon the diaphragm in amount at least 1.5 times as long, however not more than 10 times as long as the radius of the concave surface lying immediately in front of the diaphragm. For the same reason one selects the radius of the surface of the last element turned towards the image smaller in amount than the radius of the surface of the collective element, following the front element, facing the dispersive front element.

Figure 1:
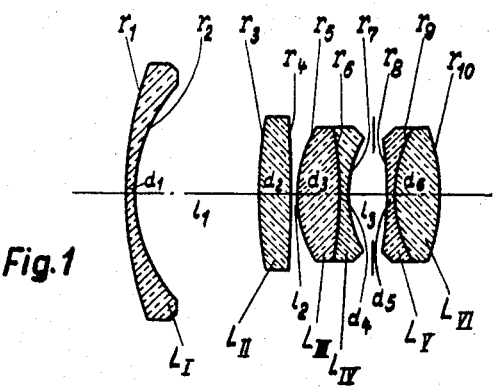
Figure 2:
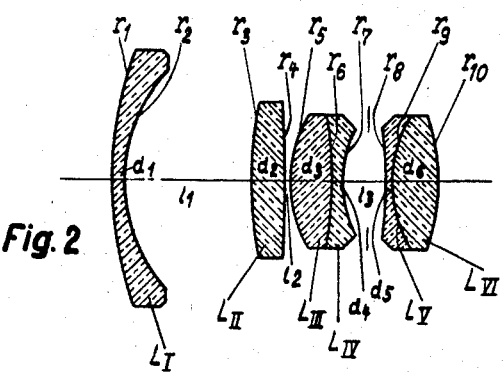

Two execution Examples I and II of the objective in accordance with the invention are represented in the accompanying illustrations, and numerical values for these examples are specified in the following cited tables. In Figs. 1 and 2 and in the examples $r$ signifies the radii
$d$ the thickness, and
$l$ the distances of the individual elements Besides the values for the refractive indices $n_d$ and the Abbe numbers $v$ as well as the refractive powers $\Delta n/r$ of the individual surfaces are specified. The values are referred to a focal length $f=1$. Both examples possess a relative aperture of 1:5.6.

Example I
[Intercept length = $1.118 \cdot f$.]

| Lenses | Radii | Thicknesses and Spaces | $n_d$ | $v$ | $\Delta n/r$ |
|---|---|---|---|---|---|
| $L_I$ | $r_1 = +0.722697$ | $d_1 = 0.01915$ | 1.55232 | 63.5 | +0.764248 |
|  | $r_2 = +0.304758$ |  |  |  | −1.812323 |
|  |  | $l_1 = 0.24761$ |  |  |  |
| $L_{II}$ | $r_3 = +0.810884$ | $d_2 = 0.06344$ | 1.62299 | 58.1 | +0.768285 |
|  | $r_4 = -2.28543$ |  |  |  | +0.272592 |
|  |  | $l_2 = 0.00633$ |  |  |  |
| $L_{III}$ | $r_5 = +0.249142$ | $d_3 = 0.08259$ | 1.62045 | 38.0 | +2.490347 |
|  | $r_6 = -0.733171$ |  |  |  | −0.140445 |
| $L_{IV}$ | $r_7 = +0.218885$ | $d_4 = 0.01865$ | 1.72342 | 38.0 | −3.305023 |
|  | $r_8 = -0.722697$ |  |  |  | −0.832161 |
|  |  | $l_3 = 0.07926$ |  |  |  |
| $L_V$ | $r_9 = +0.256418$ | $d_5 = 0.01332$ | 1.60140 | 38.3 | +0.144842 |
| $L_{VI}$ | $r_{10} = -0.367451$ | $d_6 = 0.08909$ | 1.63854 | 55.5 | +1.737756 |

Example II
[Intercept length = $1.1135 \cdot f$.]

| Lenses | Radii | Thicknesses and Spaces | $n_d$ | $v$ | $\Delta n/r$ |
|---|---|---|---|---|---|
| $L_I$ | $r_1 = +0.738655$ | $d_1 = 0.01929$ | 1.55232 | 63.5 | +0.747737 |
|  | $r_2 = +0.311483$ |  |  |  | −1.773195 |
|  |  | $l_1 = 0.25332$ |  |  |  |
| $L_{II}$ | $r_3 = +0.805273$ | $d_2 = 0.06459$ | 1.62588 | 35.6 | +0.777227 |
|  | $r_4 = -2.40403$ |  |  |  | +0.260346 |
|  |  | $l_2 = 0.00587$ |  |  |  |
| $L_{III}$ | $r_5 = +0.254646$ | $d_3 = 0.08153$ | 1.61835 | 36.4 | +2.428273 |
|  | $r_6 = -0.728103$ |  |  |  | −0.141683 |
| $L_{IV}$ | $r_7 = +0.223710$ | $d_4 = 0.02181$ | 1.72151 | 29.3 | −3.225202 |
|  | $r_8 = -0.771251$ |  |  |  | −0.788343 |
|  |  | $l_3 = 0.08053$ |  |  |  |
| $L_V$ | $r_9 = +0.243892$ | $d_5 = 0.01342$ | 1.60801 | 46.2 | +0.125178 |
| $L_{VI}$ | $r_{10} = -0.375568$ | $d_6 = 0.09143$ | 1.63854 | 55.5 | +1.700198 |

I claim:

1. A highly corrected photographic objective having an intercept length of more than 80 percent of the total focal length comprising four lens components, the first being a dispersive meniscus-shaped component, the second a biconvex collective component, the third a meniscus-shaped dispersive component, and the fourth a meniscus-shaped collective component, the two latter said meniscus components each consisting of two cemented together lens elements of opposite refractive power and turning their concave surfaces towards the diaphragm located between them, the vertex distance between the two surfaces bounding the first air space lying within the limits $0.15 \cdot f$ and $1.5 \cdot f$, $f$ being the focal length of the total objective.

2. Photographic objective according to claim 1, the radius of the concave surface immediately following the diaphragm in amount being at least 1.5 times as long, however not more than 10 times as long as the radius of the concave surface lying immediately in front of the diaphragm.

3. Photographic objective according to the claim 1, the refractive powers ($\Delta n/r$) each deviating at most by $\pm 0.2/f$, and the lens thicknesses ($d$) and the air distances ($l$) each at most $\pm 0.05 \cdot f$ from the values to be taken from the following numerical example:

| Lenses | Radii | Thicknesses and Separations | $n_d$ | $v$ | $\Delta n/r$ |
|---|---|---|---|---|---|
| $L_I$ | $r_1 = +0.722697 \cdot f$ | $d_1 = 0.01915 \cdot f$ | 1.55232 | 63.5 | $+0.764248/f$ |
|  | $r_2 = +0.304758 \cdot f$ | $l_1 = 0.24761 \cdot f$ |  |  | $-1.812323/f$ |
| $L_{II}$ | $r_3 = +0.810884 \cdot f$ | $d_2 = 0.06344 \cdot f$ | 1.62299 | 58.1 | $+0.768285/f$ |
|  | $r_4 = -2.28543 \cdot f$ | $l_2 = 0.00633 \cdot f$ |  |  | $+0.272592/f$ |
| $L_{III}$ | $r_5 = +0.249142 \cdot f$ | $d_3 = 0.08259 \cdot f$ | 1.62045 | 38.0 | $+2.490347/f$ |
| $L_{IV}$ | $r_6 = -0.733171 \cdot f$ | $d_4 = 0.01865 \cdot f$ | 1.72342 | 38.0 | $-0.140445/f$ |
|  | $r_7 = +0.218885 \cdot f$ | $l_3 = 0.07926 \cdot f$ |  |  | $-3.305023/f$ |
| $L_V$ | $r_8 = -0.722697 \cdot f$ | $d_5 = 0.01332 \cdot f$ | 1.60140 | 38.3 | $-0.832161/f$ |
|  | $r_9 = +0.256418 \cdot f$ |  |  |  | $+0.144842/f$ |
| $L_{VI}$ | $r_{10} = -0.367451 \cdot f$ | $d_6 = 0.08909 \cdot f$ | 1.63854 | 55.5 | $+1.737756/f$ |

$f$ being the focal length of the objective example
$r_1 \ldots r_{10}$ being the radii
$d_2 \ldots d_6$ being the thickness of and $l \ldots l_3$ the air separations between the individual lens elements $L_I \ldots L_{VI}$
$n_d$ being the refractive indices
$v$ being the Abbe numbers of the glass materials, and
$\Delta n/r$ being the refractive powers of the glass surfaces 4. Photographic objective according to the claim 1, the refractive powers ($\Delta n/r$) each deviating at most by $\pm 0.2/f$ and the lens thicknesses ($d$) and the air distances ($l$) each by at most $\pm 0.05 \cdot f$ from the values to be taken from the following numerical example:

| Lenses | Radii | Thicknesses and Separations | $n_d$ | $v$ | $\Delta n/r$ |
|---|---|---|---|---|---|
| $L_I$ | $r_1 = +0.738655 \cdot f$ | $d_1 = 0.01929 \cdot f$ | 1.55232 | 63.5 | $+0.747737/f$ |
|  | $r_2 = +0.311483 \cdot f$ | $l_1 = 0.25332 \cdot f$ |  |  | $-1.773195/f$ |
| $L_{II}$ | $r_3 = +0.805273 \cdot f$ | $d_2 = 0.06459 \cdot f$ | 1.62588 | 35.6 | $+0.777227/f$ |
|  | $r_4 = -2.40403 \cdot f$ | $l_2 = 0.00587 \cdot f$ |  |  | $+0.260346/f$ |
| $L_{III}$ | $r_5 = +0.254646 \cdot f$ | $d_3 = 0.08153 \cdot f$ | 1.61835 | 36.4 | $+2.428273/f$ |
| $L_{IV}$ | $r_6 = -0.728103 \cdot f$ | $d_4 = 0.02181 \cdot f$ | 1.72151 | 29.3 | $-0.141683/f$ |
|  | $r_7 = +0.223710 \cdot f$ | $l_3 = 0.08053 \cdot f$ |  |  | $-3.225202/f$ |
| $L_V$ | $r_8 = -0.771251 \cdot f$ | $d_5 = 0.01342 \cdot f$ | 1.60801 | 46.2 | $-0.788343/f$ |
|  | $r_9 = +0.243892 \cdot f$ |  |  |  | $+0.125178/f$ |
| $L_{VI}$ | $r_{10} = -0.375568 \cdot f$ | $d_6 = 0.09143 \cdot f$ | 1.63854 | 55.5 | $+1.700198/f$ |

$f$ being the focal length of the objective example
$r_1 \ldots r_{10}$ being the radii
$d_2 \ldots d_6$ being the thickness of, and
$l_1 \ldots l_3$ the air separations between the individual lens elements $L_I \ldots L_{VI}$
$n_d$ being the refractive indices
$v$ being the Abbe numbers of the glass materials, and
$\Delta n/r$ being the refractive powers of the glass surfaces.

References Cited in the file of this patent
UNITED STATES PATENTS

| | | |
|---|---|---|
| 1,863,099 | Bowen | June 14, 1932 |
| 1,897,262 | Kitroser | Feb. 14, 1933 |
| 2,341,385 | Kingslake | Feb. 8, 1944 |
| 2,622,480 | Bertele | Dec. 23, 1952 |
| 2,649,022 | Angenieux | Aug. 18, 1953 |